US006522240B1

(12) United States Patent
Weiss et al.

(10) Patent No.: US 6,522,240 B1
(45) Date of Patent: Feb. 18, 2003

(54) TELECONTROL DEVICE AND METHOD FOR THE OPERATION OF TELECONTROL DEVICE

(75) Inventors: Karl-Ernst Weiss, Ettlingen (DE); Heidrun Hacker, Hemmingen (DE); Stephan Schmitz, Stuttgart (DE)

(73) Assignee: Robert Bosch GmbH, Stuttgart (DE)

( * ) Notice: Subject to any disclaimer, the term of this patent is extended or adjusted under 35 U.S.C. 154(b) by 0 days.

(21) Appl. No.: 09/155,688

(22) PCT Filed: Feb. 3, 1998

(86) PCT No.: PCT/DE98/00295

§ 371 (c)(1), (2), (4) Date: Mar. 1, 1999

(87) PCT Pub. No.: WO98/34201

PCT Pub. Date: Aug. 6, 1998

(30) Foreign Application Priority Data

Feb. 4, 1997 (DE) ........................................ 197 03 998

(51) Int. Cl.[7] ................................................ H04Q 1/00

(52) U.S. Cl. ..................... 340/5.25; 340/5.64; 340/5.72

(58) Field of Search .............................. 340/5.25, 10.5, 340/10.51, 5.61, 5.64, 5.72

(56) References Cited

U.S. PATENT DOCUMENTS 3,732,465 A * 5/1973 Palmer ...................... 340/5.61
4,347,545 A * 8/1982 Weishaupt ................. 340/5.25
4,835,407 A * 5/1989 Kataoka ..................... 340/5.72
5,150,114 A * 9/1992 Johansson .................. 340/10.5
5,506,575 A * 4/1996 Ormos ....................... 340/5.25
5,854,593 A * 12/1998 Dykema .................... 340/5.25
6,020,827 A * 2/2000 Konrad ...................... 340/5.25

FOREIGN PATENT DOCUMENTS

| | | | | |
|---|---|---|---|---|
| DE | 197 43 101 | | | 5/1998 |
| EP | 0 285 419 | | | 10/1988 |
| EP | 0 427 342 | | | 5/1991 |
| GB | 2 164 825 | | | 3/1986 |
| GB | 2164825 | A | * | 3/1986 |
| GB | 2 192 665 | | | 1/1988 |
| GB | 2192665 | A | * | 1/1988 |

* cited by examiner

*Primary Examiner*—Brian Zimmerman
(74) *Attorney, Agent, or Firm*—Kenyon & Kenyon

(57) ABSTRACT

A telecontrol device has a base station and control elements for influencing the base station. A storage arrangement is provided in control elements and in base station, information that assigns a control element to the base station being stored in the storage arrangement. A wireless signal-transmission link is formed between base station and control elements for carrying out telecontrol without contact. One control element is configured as the main control element. If it is in the range of the signal-transmission link, the assignment information stored in the storage arrangement can be changed.

2 Claims, 3 Drawing Sheets

TELECONTROL DEVICE AND METHOD FOR THE OPERATION OF TELECONTROL DEVICE

This application is a 371 of PCT/DE98/00295 filed Feb. 3, 1998.

BACKGROUND INFORMATION

A conventional device is described in European Patent Application No. 0 285 419 in the form of an access monitoring system. Through step-by-step query of the transponder code, the system described therein makes it possible for a query unit arranged in a device to unambiguously recognize an assigned transponder from a group of several transponders which are simultaneously located in the access range of the query unit. A change in the code present in the transponder using the query unit is not described.

A conventional method of this type is described in the German Patent Application No. 196 45 769.6, according to which a telecontrol device composed of a base station and an associated remote activating element allows the training of an additional control element by transferring code information from a main control element into the control element which is to be trained. Retraining is only possible if the main control element and the control element which is to be trained are brought into the range of the base station in a predetermined manner. Only the training of control elements which have not yet been assigned is presented. Influence on control elements which have already been assigned or on the manner of the assignment is not presented. The object of the present invention is to expand the assignment function in the above-described telecontrol device and to provide options for its configuration.

SUMMARY OF THE INVENTION

The method according to the present invention allows intervention in the assignment configuration between control element and base station depending solely on the presence of the main control element, independently of the state of assignment of a control element. In addition to reassignment of a control element, the base station advantageously allows the restriction of an assignment, conditional temporary override, agreement on an auxiliary code for easier influencing of the assignment, and selective or general erasing of assignments. The specific change that takes place is determined via a keyboard or preferably through the duration of the presence of the main control element in the range of the base station. An intervention in the assignment advantageously takes place only in one control element at a time. The control element is preferably suitable for being assigned to several base stations independently of each other.

DETAILED DESCRIPTION

Figure 1:
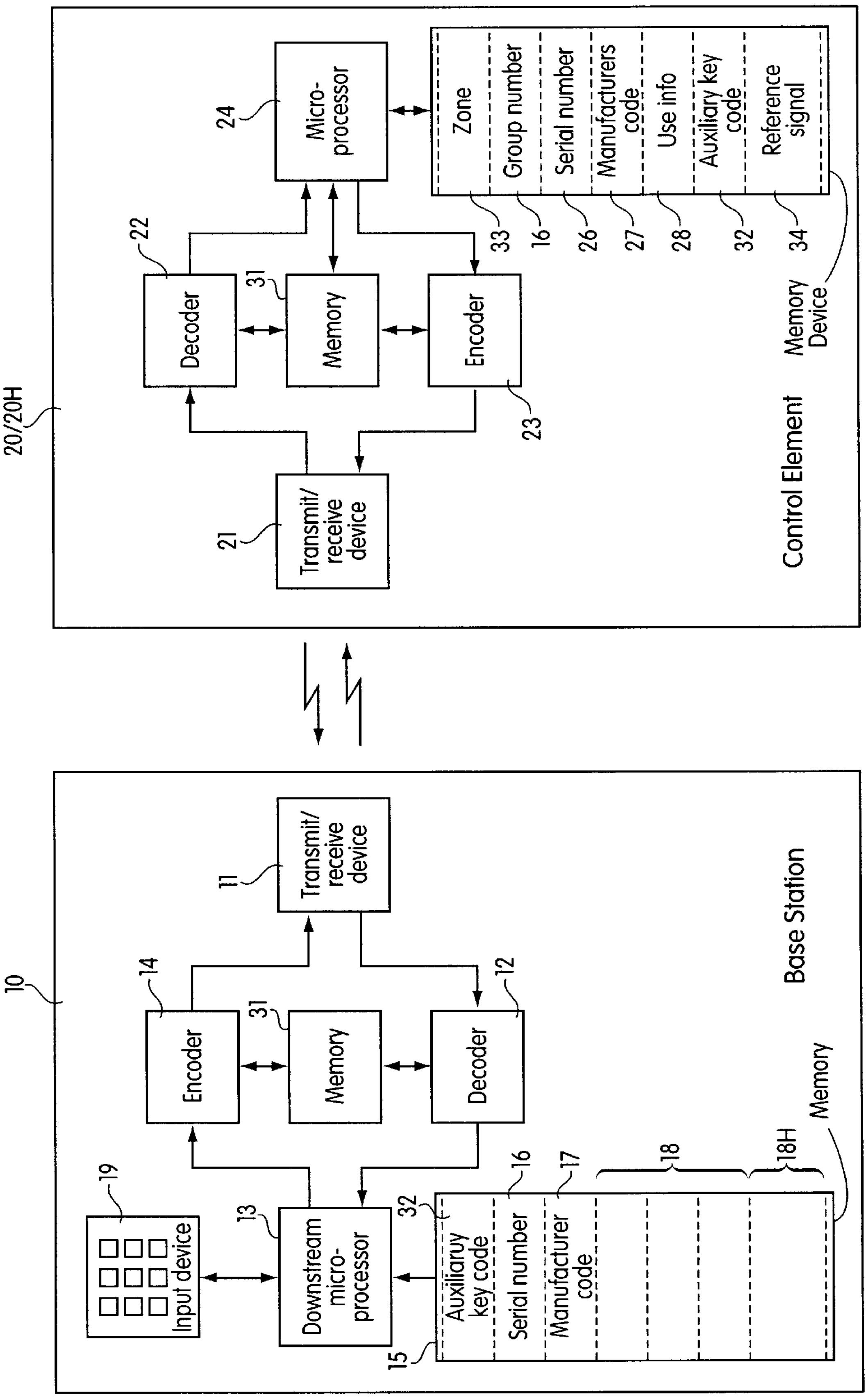
FIG. 1 shows a block diagram of a telecontrol device.

FIG. 1 shows a base station 10 which is assigned to a piece of equipment and then controls its activation and/or access to it. A base station 10 can, for example, be a part of the access control system of an automobile or of a building, or it can belong to a computer, for example, or another appliance. A device which is here referred to as a control element 20 is functionally assigned to base station 10 and acts on it without physical contact. A control element 20 can, for example, be a transponder.

In base station 10 there is a transmit/receive device 11 for emitting and receiving signals which can be transmitted over a gap 30 without contact. Connected with its output is a decoder 12 which receives coded signals from the transmit/receive device for decoding. A memory 31 with the necessary information, in particular in the form of a cryptographic key code is assigned to decoder 12 for performing the decoding. The decoded signals are directed to a downstream microprocessor 13 which analyzes them and initiates subsequent actions depending on the results of the analysis. In particular, microprocessor is monitors the emission of signals through the transmit/receive device 11. A memory 15 is also assigned to microprocessor 13. Memory 15 contains, among other things, a serial number 16, a manufacturer code 17, and a register 18, 18H with the group numbers of the control elements 20 assigned to the base station and the manufacturer code 27 corresponding to these group numbers. Main actuation element 20H is registered at memory address 18H. Manufacturer code 17 is assigned by the manufacturer of the base station and identifies it uniquely. Serial number 16 is characteristic for base stations 10 and control elements 20 assigned to each other, while the group numbers serve to distinguish control elements 20 assigned to a common base station 10 with the same serial numbers. Memory 15 also has a location 32 for storing an auxiliary key code. As a rule, signals which are to be emitted through the transmit/receive device are coded. Between microprocessor 13 and transmit/receive device, an encoder 14 is connected for this purpose which is also connected with memory 31 for performing the coding. In addition, base station 10 has an input device 19 to make it possible for a user to access microprocessor 13. Input device 19 can, for example, be configured as a key pad, as shown in FIG. 1; any number of other configurations are equally possible.

Control element 20 has a transmit/receive device 21 corresponding to the transmit/receive device of the base station for the reception of signals emitted by base station 10 and/or emission of signals transmitted with no contact to base station 10. Like base station 10, a decoder 22 is connected downstream from transmit/receive device 21 for decoding coded signals. For performing the decoding, decoder 22 is connected to a memory 31, the contents of which correspond to that of the memory 31 of the base station and in which in particular the cryptographic key code is stored which is used for coding in base station 10. Also connected to decoder 22 is a microprocessor 24 which processes signals that enter through transmit/receive device 21 and decoder 22 and initiates subsequent actions depending on the results. Microprocessor 24 monitors in particular the signals transmitted to base station 10 through transmit/receive device 21. To exclude the possibility of being overheard or simulated, this as a rule takes place in coded form. For this purpose—as in the base station—an encoder 23 is connected between microprocessor 24 and transmit/receive device 21, the encoder also being connected with memory 31 for carrying out the coding function. Microprocessor 24 also has a memory device 25. The memory includes in particular a memory location 26 for storing a serial number, a memory location 25 for storing a group number, and a memory location 27 for storing a manufacturer code. The manufacturer code is issued by the manufacturer of control element 20 and identifies it uniquely. The serial number is a characteristic code for the overall device composed of base station 10 and control elements 20. It is advantageously set by the manufacturer or, if necessary, by the user of the overall device and is identical to the serial number 16 present in base station 10. The group number serves to distinguish several control elements 20 which have the same serial number. It is set by the user of base station 10 during use of the device. In memory 25, there is also use information 28 for definition of the scope of the function of the various control elements 20.

Included in particular are use restrictions with which the action radius for the validity of a control element 20, for example, is restricted to a certain value, the maximum velocity is limited, or the control element is temporarily blocked. Use information 28 can also alternatively be stored in memory 15 of the base station. Base station 10 calls it from there following assignment of control element 20. In addition, a reference signal 34 for a null-search signal is advantageously also stored in memory 25; control element 20 can be retrained using the null-search signal.

There is a gap 30 between base station 10 and control element 20 for transmission of signals, which are transmissible with no contact, between base-station and activation-element transmit/receive devices 11 and 21, respectively. Signals emanating from base-station transmit/receive device 11 reach all control elements 20 within its range simultaneously. Infrared signals or high-frequency signals are advantageously employed as signals.

Several control elements 20, each of which allow an authorized user to initiate and/or access the piece of equipment assigned to the base station, can be assigned to one base station 10.

One of control elements 20 is configured as main control element 20H and serves only for managing the other control elements 20. Its function as main control element 20H can, for example, be established via a special group number 16 which is issued by the manufacturer and is not available for the other control elements 20. The structural makeup of main control element 20H corresponds to that of control element 20 depicted in FIG. 2. However, it does not allow activation or access to the equipment assigned to base station 10, a use restriction being permanently stored in memory 25 of main control element 20H as use information 28. Like cryptographic key code 31, the information concerning the assignment which is stored in memory 25, i.e., manufacturer code 27 and serial number 16, it cannot be changed by the user. The main control element is further distinguished from the other control elements through a zone 33 in memory 25 in which information concerning the number of valid control elements 20 assigned to a base station 10 and their manufacturer codes 17 are stored.

Figure 2:
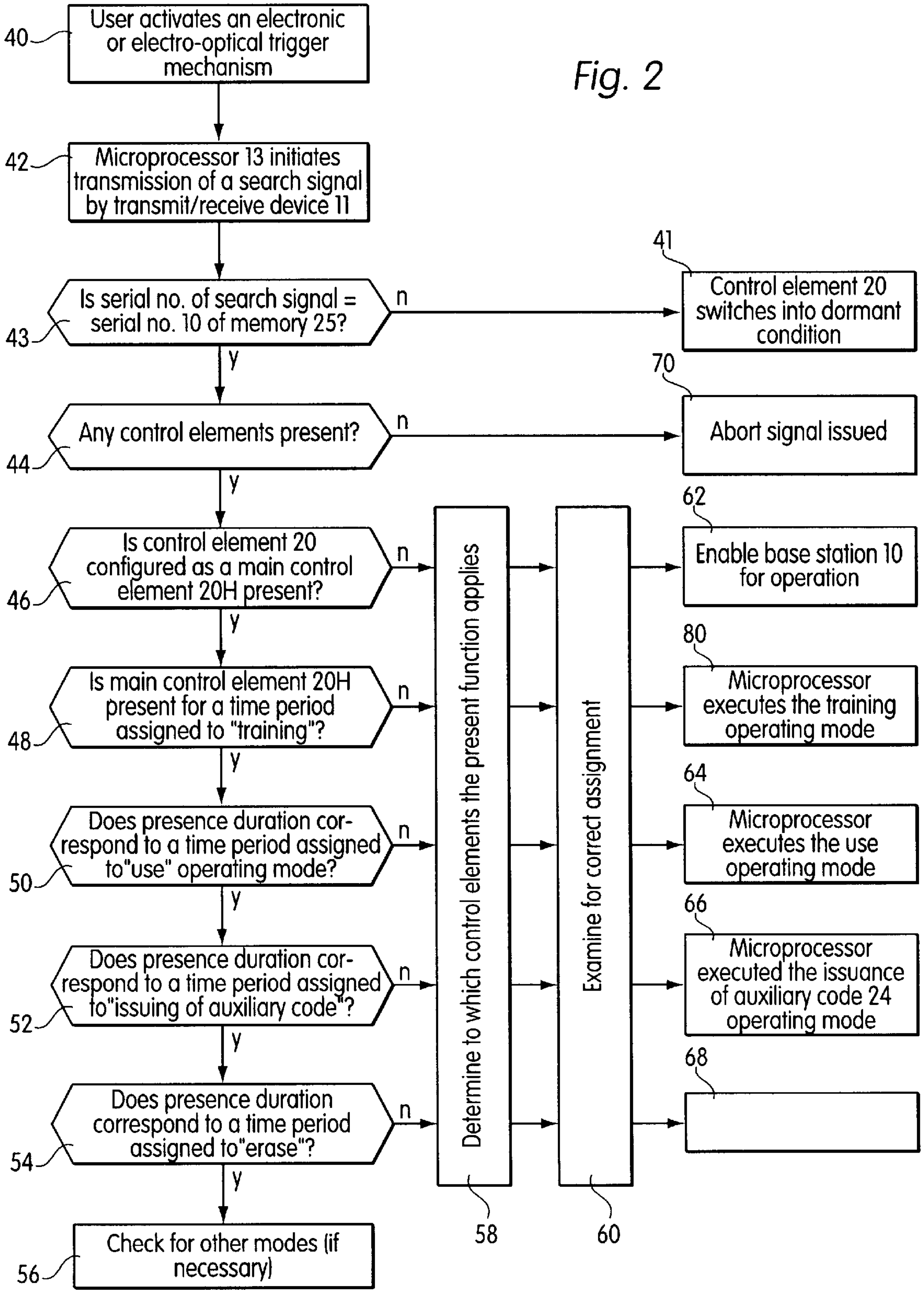
FIG. 2 shows a flow diagram illustrating an operation of the telecontrol device.
Figure 3:
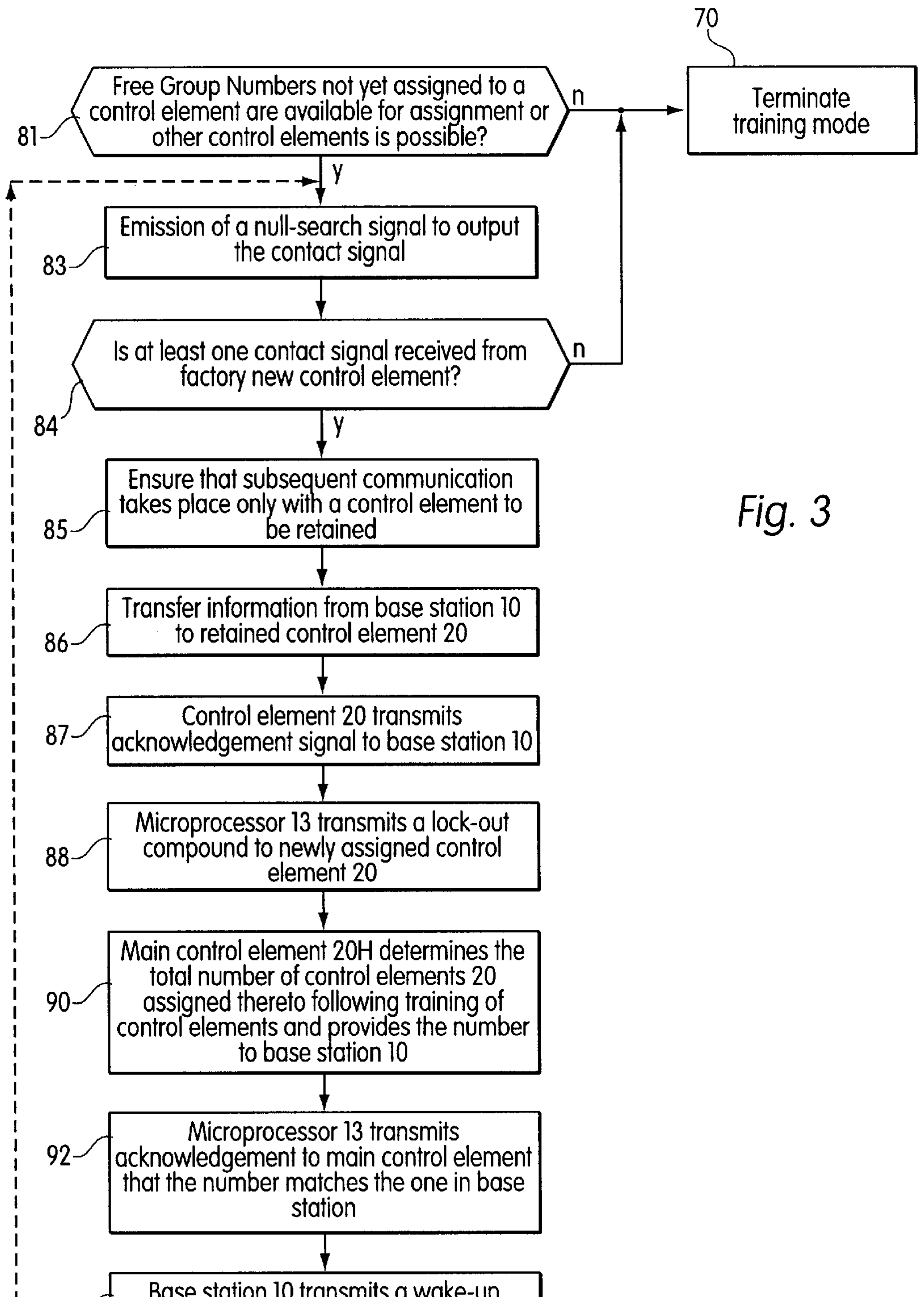
FIG. 3 shows a flow diagram of a training mode.

Referring to the flow diagram shown in FIG. 2, the mode of operation of the device depicted in FIG. 1 is described below. The letters A, B, or C on each process step indicate whether the process takes place in base station 10: A, in control element 20: B, or in main control element 20H: C.

Figure 4:
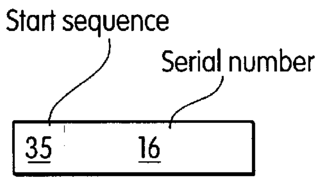
FIG. 4 shows a structure of a search signal.

The assignment process is ordinarily initiated by the user through the activation of an electric or electro-optical trigger mechanism which is not depicted, Step 40. In the case of application in connection with the door of an automobile, the trigger mechanism, for example, can be the activation of the door handle. On the basis of a trigger signal which is then emitted, microprocessor 13 of base station 10 initiates the transmission of a search signal by the transmit/receive device 11, step 42. The search signal essentially contains, as shown in FIG. 4, a start sequence 35, preferably implemented as start bit, and the serial number 16 stored in memory 15. Advantageously the search signal is not encoded. The search signal is received by all control elements 20 located within the range of radio transmission 30 through transmit/receive devices 21. Following transfer by decoder 22, it is then checked by the microprocessor 24 of all control elements 20 which were reached to determine if the serial number transmitted with the search signal agrees with the serial number 16 which is stored in memory 25 and serves as reference signal, Step 43. Start bit 15, which is transmitted with it, serves for the synchronization of microprocessor 24 with the search signal received. If the check results in that reference serial number 16 in the memory 25 does not agree with the serial number transmitted with the search signal, control element 20 switches into a dormant condition, Step 41. In this condition, control element 20 no longer participates in the subsequent communication with base station 10.

If the check in Step 43 indicates agreement of the received and the stored serial numbers 16, microprocessor 24 causes an answer in the form of a contact signal, Step 44. The contact signal is a short, simple signal, advantageously group number 26 of the associated control element 20 in bit-coded form. Like the search signal, it is not encoded. There can be several assigned control elements in the range of the base station, which all respond to a search signal by sending back a contact signal. In order to always ensure unambiguous communication, base station 10 determines from the contact signals received which of the possible authorized control elements 20 are present and notes the ones present through corresponding entries in memory 15. A process for distinguishing among several control elements 20 present at the same time is described in German Patent Application No. 196 45 769.6, the entire disclosure of which is incorporated herein by reference. If no control element 20 is determined to be present, an abort signal is issued, Step 70.

After it is determined that the control element 20 is present, the operating mode is determined; in particular the following operating modes are possible: assignment, training, resetting, issuance of auxiliary code, erasing. To select, microprocessor 13 first examines whether the control element 20 configured as main control element 20H is present, Step 46. If not, a step to examine for correct assignment follows, Step 60, with the goal of enabling base station 10 for operation, Step 62.

If microprocessor 13 detects the presence of main control element 20H, it determines the duration of its presence and derives from that the operating mode which is then activated. In this process, it first examines, for example, whether the duration of presence corresponds to a period of time which is assigned to the operating mode "training," Step 48. For example, the training operating mode can be assigned to a duration of presence of the control element from zero to 30 seconds. If applicable, the microprocessor executes the training operating mode, which will be explained later, Step 80. If main control element 20H has been present longer than the presence duration assigned to the training operating mode, microprocessor 13 then examines whether the presence duration corresponds to a period of time which is assigned to operating mode use conditions; for example, a presence duration of 30 to 120 seconds can be provided for this. If applicable, it proceeds with the operating mode use conditions, Step 64. If the check in Step 50 results in that the main control element was still not removed from the range of base station 10, microprocessor 13 checks whether the presence duration of the control element corresponds to a period of time which is assigned to operating mode "issuance of auxiliary code," possibly by checking whether main control element 20H was present up to 240 seconds. If applicable, it continues with the execution of operating mode "issuance of auxiliary code," Step 66. In the same manner, a check follows if necessary for the operating mode "erase," Step 54.

By examining additional presence time periods, the following additional operating modes can be selected, Step 56. If in the example of FIG. 2 no additional operating mode is provided in addition to the depicted operating modes assign, train, use conditions, issuance of auxiliary code, and erase, Step 54 can be eliminated. The erase operating mode is set if the check in Step 52 results in a presence duration which exceeds the time period for the use conditions operating mode.

In each case, prior to the execution of the function determined by the selected operating mode, microprocessor 13 determines to which of the control elements 20 present the function applies, Step 58. The basis for the determination, for example, can be a predetermined order of priority of control elements 20 in which the control element 20 with the lowest group number is always selected first.

Microprocessor 13 informs the selected control element by sending out its group number. All other control elements with other group numbers which may be present no longer participate in the subsequent communication. For this purpose, it can be provided that microprocessor 13 issues a command to control elements 20 which are no longer participating through which they are brought into a dormant state.

At this point, base station 10 examines the selected control element 20 for correct assignment, Step 60. In the exemplary operation shown in FIG. 2 this is accomplished by the known challenge-response method.

In this method, base station 10 transmits a challenge signal via its transmit/receive device 11 which is intended only for the selected control element 20 and is executed only by it. At the same time, base-station microprocessor 13 determines a desired response signal. The calculation results from the challenge signal according to a preset algorithm using the cryptographic key stored in memory 31 as well as the manufacturer code 17 of assigned control element 20 which is present in memory 15. The challenge signal in the meantime is received by transmit/receive device 21 in control element 20, is decoded in decoder 22, and is supplied to microprocessor 24. The microprocessor derives a response signal from the challenge signal in the same manner as base-station microprocessor 13 with the aid of cryptographic key 31 and its manufacturer code 27 and sends it back to base station 10.

There the response signal is received by transmit/receive device 11, is decoded again in decoder 12, and is supplied to microprocessor 13. The microprocessor compares it with the previously defined expected response signal. If the two do not agree, base station 10 and control element 20 do not belong together.

Processor 13 then initiates appropriate subsequent action; for example, it blocks the use of base station 10. Alternatively a notice to the user advantageously follows informing the user that an assignment has not occurred, for example via an optical or acoustic signal. Additional subsequent measures can also be provided, for example a repetition of the assignment process. If the test results in agreement between the response signal returned by control element 20 and the previously defined expected response signal, confirmation that the assignment is correct is given. Advantageously it takes place in a form which can be perceived by the user optically or acoustically and results, for example, in base station 10 being enabled.

If operating mode "training" is selected, microprocessor 13 first examines main control element 20H for correct assignment, as in the case of the test for correct assignment when assigning a control element 20 according to Step 75. If correct assignment of main control element 20H and base station 10 is determined, microprocessor 13 checks, on the basis of register 18, whether free group numbers not yet assigned to a control element are still available and whether assignment of other control elements 20 to base station 10 is possible at all, Step 81. In the event of a negative result of the check, the training mode is terminated, Step 70. In the event of a positive result of the check, a check of whether there are still control elements 20 in the range of the base station which have not yet been trained follows. For this purpose, microprocessor 13 causes the emission of a null-search signal, Step 83, which, for example, has the form of a special serial number which is characteristic for factory-new control elements 20 and can be carried out be directly by a factory-new control element. It is advantageously present in the memory 25 of each control element as an unmodifiable reference signal 34. Upon reception of a null-search signal, the respective microprocessors 24 of those control elements cause the contact signal which is initially randomly generated to be output. Base station 10 examines receipt of such a signal, Step 84. If at least one contact signal has been received from a factory-new control element 20, the base station then performs a routine to ensure that the subsequent communication takes place only with a control element 20 which is to be retrained, Step 85. An isolating routine of this type is described in the above-described German patent application no. 196 45 769.6, to which reference is made. If no contact signal is received, training is terminated, Step 70.

After a single active control element 20 which is to be trained has been separated in the effective range of gap 30, microprocessor 13 causes the transfer of serial number 16, cryptographic code key 31, as well as one of the characteristic group numbers which will be assigned in the future to the control element 20. Control element 20 receives the transferred code information 16, 26, 31 into the locations in memory 20 which were provided for them and to this point were unoccupied. After successful transfer and storage of code information 16, 26, 31, control element 20 transmits an acknowledgment signal to base station 10, Step 87. This advantageously is manufacturer code 27 which base-station microprocessor 13 stores in memory 15 with the previously assigned group number. Then microprocessor 13 transmits a lock-out command to the newly assigned control element 20, Step 88, which causes the serial number 16 previously written in memory 25 and the cryptographic code information stored in memory 31 to be protected against writing and reading. Following this, control element 20 is assigned to base station 10.

Main control element 20H also registers the training of a new control element 20, for example, on the basis of the lock-out command previously issued by the microprocessor, and requests transmission by base station 10 of manufacturer code 17 of new control element 20. After receipt, main control element 20H determines, with the aid of information 33 present in its memory 25 concerning the number of control elements 20 assigned to base station 10 and their manufacturer code, the total number of assigned control elements 20 present following training of the new control elements and communicates the number to base station 10, Step 90. Its microprocessor 13 then checks whether this number matches the number of control elements 20 registered in register 18, Step 92. In the event of the affirmative, it acknowledges to main control element 20H the new total number, advantageously by transmitting back the number recorded. Main control element 20H then accepts manufacturer code 27 of the newly added control element 20 as well as the new total number into its memory 25. If the number determined by main control element 20H and the number determined by the microprocessor 13 do not match, no recording takes place.

In Step 94 which follows, base station 10 transmits a wakeup command through which any additionally present, dormant control elements 20 are switched to be active again. Now the training of additional control elements 20 which are to be reassigned can follow by branching back to Step 83.

In the same manner as factory-new control elements, control elements which have already been trained can also be trained, i.e., control elements in whose memory 25 a serial number and a group number are already present. Upon receipt of a signal from a base station, they first test to determine whether the signal agrees with the serial number stored in memory 25. If that is not the case, they test to determine whether the received signal is a zero-search signal and if it agrees with the reference signal stored in memory location 34. If according to this a previously trained control element 20 is present, it answers as a factory-new control element with the transmission of a randomly set contact signal and is then trained analogously to the factory-new control elements according to Steps 85 through 88.

In the "use conditions" operating mode, base station 10, after selection of a control element 20, first performs a test for correct assignment for the main control element 20H, Step 60, and then a test for correct assignment for the selected control element 20 which is to be blocked. If both tests are successful, base station 10 transmits a supplemental assignment setting to selected control element 20 which accepts it into its memory 25 as use information 28. The supplemental assignment setting can, for example, be a restriction on use. For example, the effect of enabling a control element 20 for operation can be restricted to a specified area of action. Likewise, control element 20 can be disabled for a period of time or the presence of a certain additional control element 20 in the range of base station 10 can be made a condition for unrestricted enabling of base station 10 for operation. For each supplemental setting there is also a reversal function which, for example, enables again a control element which was restricted with respect to its area of action or for a period of time. Also handling conditions, such as the presence of certain additional control elements, can be canceled. Particular supplemental settings are established and/or withdrawn using input device 19, preferably through activation of keys.

Alternatively to depositing use information in memory 25 of control elements 20, this can also be done in memory 15 of base station 10, advantageously as an addition to the associated entry in register 18 from which it can be read out as needed.

In operating mode "issuance of auxiliary code," a test for correct assignment according to Step 60 is also initially performed for main control element 20H and then for selected control element 20. Then the user sets an auxiliary code in the form of a secret code using input device 19. Auxiliary code 32 is stored in memory 15 of base station 10 and is transferred to control elements 20 present which likewise store it in their individual memories 25. Afterward the functionality of control elements equipped with auxiliary code 32 can be influenced by using the input device alone; simultaneous or prior presence of the main control element 20H is not necessary. To accomplish this, the user must input the auxiliary code through input device 19. It is forwarded by base station 10 to a control element 20 present which is then ready to receive additional agreements. For example, in the case of application in automobiles, it can be specified that a control element 20 may enable the starting of the motor but not the glove compartment, or that a change from the saved vehicle settings, such as the mirror or seat setting, is not possible. Control elements 20 store additional agreements in the same way in their memories 25. At each test for correct assignment, they provide the contents of the memory with additional agreements to base station 10 which then takes them into account.

In the operating mode "erase," a test for correct assignment is carried out analogously with the operating mode "lock-out," Step 60, first for the main control element 20H and then for the selected control element 20. Following this, base station 10 erases the entries in its memory 15 which belong to the selected control element 20 in register 18, i.e., in particular its group number and the associated manufacturer code.

The erase command is advantageously triggered using input device 19. It can be provided that in the operating mode erase, the register entries 18 of all control elements 20 within the range of base station 10 are erased in sequence or simultaneously. It is also advantageously possible to be able to erase the entire register 18 independently of the presence of the control elements 20 involved. All control elements are advantageously erased using a command entered via input device 19. In Step 60, the test for correct assignment takes place only for main control element 20H, not for a selected control element 20. Register entry 18 of main control element 20H cannot be erased.

In place of the duration of presence of the main control element 20H in the range of base station 10, the selection of operating mode can also be carried out using input device 19. After receiving a contact signal from a control element 20, Step 44, in this case a routine for establishing which operating mode is selected is carried out by the base station. In place of the test in Step 46 of whether main control element 20H is present, a test, for example, is then carried out as to whether the operating mode "assign" is selected, with subsequent branching as needed to Step 62 via Step 58. In Steps 48, 50, 52, 54, in place of the duration of presence, inputs are queried via input device 19.

The above-described method and/or the above described arrangement can be configured and modified in many ways while retaining the fundamental idea of being able to influence the assignment of control elements which are components of a telecontrol system, and modify them in many ways in the presence of a main control element 20H. This applies in particular to the internal structure of base station and control elements and for the configuration and sequence of the steps of the method, for example, with respect to the point in time of performing the test of proper access or the treatment of factory-new and/or pre-trained control elements in training.

What is claimed is:

1. A base station for operating a telecontrol device and available only to an authorized user, comprising:

a control device assigning a particular element of at least one control element to the base station and providing assignment information, the at least one control element influencing the base station;

a memory device, the control device storing the assignment information in the memory device in a form of characteristic information corresponding to at least one individual assignment of the particular element; and a transceiver device at least one of transmitting signals to the particular element and receiving the signals from the particular element, wherein the control device determines whether a main control element of the at least one control element is present in a range of the transceiver device, and after determining that the main control element is present, places the main control element into a dormant mode, and wherein the base station is configured to change the assignment information stored in the memory device if the main control element is present.

2. A base station for operating a telecontrol device and available only to an authorized user, comprising:

a control device assigning a particular element of at least one control element to the base station and providing assignment information, the at least one control element influencing the base station;

a memory device, the control device storing the assignment information in the memory device in a form of characteristic information corresponding to at least one individual assignment of the particular element; and a transceiver device at least one of transmitting signals to the particular element and receiving the signals from the particular element, wherein the control device determines whether a main control element of the at least one control element is present in a range of the transceiver device, and wherein the base station is configured to change the assignment information stored in the memory device if the main control element is present, and wherein the control device determines that changes are to be made in contents a further memory device of the at least one particular element as a function of a duration of a presence of the main control element.

* * * * *

UNITED STATES PATENT AND TRADEMARK OFFICE

CERTIFICATE OF CORRECTION

PATENT NO. : 6,522,240 B1
DATED : February 18, 2003
INVENTOR(S) : Weiss et al.

It is certified that error appears in the above-identified patent and that said Letters Patent is hereby corrected as shown below:

Column 2,
Line 16, change “microprocessor is” to -- microprocessor 13 --.

Signed and Sealed this

Tenth Day of February, 2004

JON W. DUDAS
*Acting Director of the United States Patent and Trademark Office*